(12) United States Patent
Berchane et al.

(10) Patent No.: US 10,487,986 B2
(45) Date of Patent: *Nov. 26, 2019

(54) PROTECTING A FLUID STREAM FROM FOULING

(71) Applicant: ExxonMobil Upstream Research Company, Spring, TX (US)

(72) Inventors: Nader S. Berchane, Spring, TX (US); Chisa K. Brookes, Harrisburg, NC (US); Douglas J. Turner, Kingwood, TX (US); Jason W. Lachance, Magnolia, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/625,351

(22) Filed: Jun. 16, 2017

(65) Prior Publication Data

US 2018/0363856 A1  Dec. 20, 2018

(51) Int. Cl.
| | |
|---|---|
| *B01D 21/01* | (2006.01) |
| *C09K 5/06* | (2006.01) |
| *C09K 8/52* | (2006.01) |
| *E21B 36/00* | (2006.01) |
| *F17D 1/18* | (2006.01) |

(Continued)

(52) U.S. Cl.
CPC .............. *F17D 1/18* (2013.01); *B01D 21/01* (2013.01); *C09K 5/063* (2013.01); *C09K 8/524* (2013.01); *C09K 8/536* (2013.01); *E21B 36/008* (2013.01); *E21B 43/36* (2013.01); *F17D 3/12* (2013.01); *C09K 2208/22* (2013.01)

(58) Field of Classification Search
CPC .. F17D 1/18; F17D 3/12; C09K 5/063; C09K 8/536; C09K 8/524; C09K 5/02; C09K 5/06; C09K 8/52; C09K 8/528; C09K 2208/22; B01D 21/01; B01D 17/00; B01D 17/005; B01D 21/00; B01D 36/00; B01D 36/04; B01D 37/00; B01D 37/03; E21B 36/008; E21B 36/005; E21B 36/006; E21B 37/06; E21B 43/01; E21B 43/34; E21B 43/36; C02F 1/00; C02F 1/001; C02F 1/02; C02F 1/52; C02F 1/5209; C02F 2203/22; Y10T 137/206
USPC ......... 166/250.05, 279, 280.1, 369; 210/696, 210/702, 767, 748.01, 806, 774
See application file for complete search history.

(56) References Cited

U.S. PATENT DOCUMENTS

| | | | |
|---|---|---|---|
| 3,279,541 A | 10/1966 | Knox | 166/300 |
| 3,682,249 A | 8/1972 | Fischer | 166/304 |

(Continued)

FOREIGN PATENT DOCUMENTS

| | | | | |
|---|---|---|---|---|
| GB | 2358655 | * | 1/2000 | ............. E21B 36/00 |

OTHER PUBLICATIONS

Kelland, Malcolm A. (2006) "History of the Development of Low Dosage Hydrate Inhibitors," *Energy & Fuels*, v. 20, No. 3, May/Jun. 2006, pp. 824-847.

*Primary Examiner* — Joseph W Drodge
(74) *Attorney, Agent, or Firm* — ExxonMobil Upstream Research Company—Law Department

(57) ABSTRACT

Embodiments described herein provide a system and methods for protecting a fluid stream from fouling using particles that include phase change materials. In an example, the particles are injected into the fluid stream and release energy at a selected temperature, which may warm the fluid stream.

14 Claims, 13 Drawing Sheets

(51) Int. Cl.
*F17D 3/12* (2006.01)
*C09K 8/524* (2006.01)
*C09K 8/536* (2006.01)
*E21B 43/36* (2006.01)

(56) References Cited

U.S. PATENT DOCUMENTS

| | | | |
|---|---|---|---|
| RE32,302 E | 12/1986 | Almond et al. | 166/308.6 |
| 5,424,285 A | 6/1995 | Stacy | 166/308.6 |
| 5,879,561 A | 3/1999 | Klomp et al. | 210/698 |
| 6,000,438 A | 12/1999 | Ohrn | 138/149 |
| 6,116,290 A | 9/2000 | Ohrn et al. | 138/149 |
| 7,105,104 B2 | 9/2006 | Chomard et al. | 252/70 |
| 7,745,379 B2 | 6/2010 | Collins | 507/128 |
| 7,833,947 B1 | 11/2010 | Kubala | 166/305.1 |
| 8,349,188 B2 | 1/2013 | Soane | 210/666 |
| 9,714,374 B2 * | 7/2017 | Berchane | C09K 8/524 |
| 2004/0011990 A1 | 1/2004 | Dunaway et al. | 252/62 |
| 2005/0161631 A1 | 7/2005 | Walker et al. | 252/70 |
| 2006/0065396 A1 | 3/2006 | Dawson | 166/279 |
| 2007/0007211 A1 | 1/2007 | Sevier | 210/696 |
| 2007/0129262 A1 | 6/2007 | Gurmen | 507/261 |
| 2008/0230203 A1 | 9/2008 | Christ | 165/10 |
| 2008/0314043 A1 | 12/2008 | Howard et al. | 60/641.7 |
| 2009/0078406 A1 | 3/2009 | Talley et al. | 166/177.3 |
| 2009/0242204 A1 | 10/2009 | Buijse | 166/302 |
| 2010/0116451 A1 * | 5/2010 | Bhat | B32B 29/00 162/109 |
| 2010/0139924 A1 * | 6/2010 | Abney | E21B 36/005 166/335 |
| 2010/0263867 A1 | 10/2010 | Horton | 166/292 |
| 2010/0300688 A1 * | 12/2010 | Panga | C09K 8/80 166/280.2 |
| 2011/0180422 A1 | 7/2011 | Mothersbaugh et al. | 205/742 |
| 2012/0015852 A1 | 1/2012 | Quintero et al. | 507/112 |
| 2013/0025873 A1 * | 1/2013 | Berchane | C09K 8/524 166/335 |
| 2015/0040888 A1 * | 2/2015 | Zakhidov | C09K 5/10 126/618 |
| 2015/0184490 A1 * | 7/2015 | Kanstad | F28G 9/00 166/335 |

* cited by examiner

100

136

200

800

900

1000

1100

PROTECTING A FLUID STREAM FROM FOULING

CROSS REFERENCE TO RELATED APPLICATIONS

This application is a divisional of U.S. patent application Ser. No. 13/545,639 filed Jul. 10, 2012 which claims the benefit of U.S. Provisional patent application No. 61/508,481 filed on Jul. 15, 2011 entitled PROTECTING A FLUID STREAM FROM FOULING, the entirety of which is incorporated herein.

FIELD

Exemplary embodiments of the present techniques relate to protecting hydrocarbon transportation lines from clathrate hydrate and wax formation.

BACKGROUND

The presence of water or paraffinic hydrocarbons, e.g., waxes, in production fluids may cause problems while transporting a hydrocarbon due to the formation of solids, such as clathrate hydrates or wax deposits, with the hydrocarbons. Clathrate hydrates (hereinafter clathrate or hydrate) are composites formed from a water matrix and a guest molecule, such as methane or carbon dioxide, among others. Clathrates may form, for example, at the high pressures and low temperatures that may be found in pipelines and other hydrocarbon equipment. For any particular clathrate composition involving water and guest molecules, such as methane, ethane, propane, carbon dioxide, and hydrogen sulfide, at a particular pressure there is a specific clathrate equilibrium temperature, above which clathrates are not stable and below which they are stable. After forming, the clathrates can agglomerate, leading to plugging or fouling of the equipment. Further, many hydrocarbons, such as crude oil, may contain significant amounts of wax, e.g., in the form of paraffinic compounds that may precipitate as temperatures are lowered. These paraffinic compounds as well as hydrates can form layers along cold surfaces, such as the inner wall of a subsea pipeline and can cause fouling or plugging of equipment.

Various techniques have been used to lower the ability for clathrates to form or cause plugging or fouling. Exemplary, but non-limiting techniques include insulation of lines, heating of lines, dehydration of the hydrocarbon, and the adding of thermodynamic hydrate inhibitors (THIs), kinetic hydrate inhibitors (KHIs), and/or anti-agglomerates (AAs).

Insulation, active heating, and dehydration can be expensive, especially for subsea systems. Even with insulation, cool-down of production fluids can limit the distance of a producing pipeline. For example, the contents of the pipeline may cool down during shut-in periods and form a clathrate or wax plug. If a clathrate blockage does occur, insulation can be detrimental by preventing heat transfer from the surroundings that is needed for clathrate melting.

Inhibitors, such as thermodynamic hydrate inhibitors (THIs), kinetic hydrate inhibitors (KHIs), and/or anti-agglomerates (AAs), may help mitigate or prevent the formation of clathrate deposits. However, the quantities required for total inhibition, for example, using THIs, may be large and proportional to the amount of water produced, leading to increasing and even prohibitive quantities late in field life. Further, the addition of too low an amount of inhibitor, either THIs or KHIs may actually increase the likelihood of plugging.

An alternative to the use of THIs and KHIs is cold flow technology, in which clathrate can be formed in a manner that prevents clathrate particles from sticking to each other without the use of chemical inhibitors.

Accordingly, research is continuing to identify techniques for preventing clathrate plugging during hydrocarbon transport. For example, some research has been performed on materials that may be used as energy sources to provide heat energy to a system. The formation of clathrates and wax deposits are exothermic, meaning they must release the heat generated while they are forming. Thus, if heat cannot be released, no additional clathrates or wax can form even though the materials may be at their respective equilibrium temperature. This is a common property of many materials, which emit heat, i.e., are exothermic, during a phase change, such as solidification from a liquid. The release of the heat energy maintains the material temperature at some equilibrium value until the phase change is complete. Such a phase change commonly occurs when a system undergoes a change in its physical state such as cooling or pressurizing. In contrast to a clathrate, a salt hydrate is a salt-crystal that contains water molecules associated with the salt crystal, such as $CuSO_4 \cdot 5H_2O$. Clathrate hydrates should not be confused with salt hydrates, which are commonly used as phase-change materials, for example, to absorb or provide heat energy.

Phase change materials have been disclosed for use in clathrate/wax mitigation, for example, in the insulation. For example, U.S. Pat. No. 6,000,438 to Ohm discloses an insulation that has an integrated phase change material for subsea flowlines or pipelines that is alleged to have improved transient heat-loss characteristics that may extend a cool down time of hydrocarbon fluid mixtures during shut-in conditions. The phase change material can surround a carrier pipe of the pipeline, and may be dispersed or encapsulated within standard insulation layer. Additional layers or pipes may surround the phase change material and hold it against the carrier pipe. The phase change material can be a micro-encapsulated or bulk-encapsulated type.

U.S. Pat. No. 7,745,379 to Collins discloses a method for insulating subsea pipeline bundles. The insulation is a gelled material, for example an orthophosphate ester to which a ferric salt, such as ferric sulphate, has been added as a gelling agent. Prior to gelling, the materials can be injected into the annulus between a carrier pipe and hydrocarbon carrying tubular line. The gel may contain a phase change material that can provide some heat energy during a shut-in condition.

In both of these patents, the phase change materials are installed as immobile permanent fixtures. The disadvantage of these systems is that the heat must be recovered if the phase change material solidifies, which keeps the system cooled for longer periods of time. Additionally, the remote location of insulation in a subsea application can cause difficulties in maintenance and introduce insulation inadequacies.

SUMMARY

An embodiment provides a method for protecting a fluid stream from fouling. The method includes injecting particles into the fluid stream, wherein the particles comprise a phase change material configured to release energy at a selected temperature.

The selected temperature may be greater than a clathrate formation temperature in the fluid stream. Further, the selected temperature may be greater than a wax precipitation temperature. The particles may be transported to an injection site as a slurry.

The particles may be separated from the fluid stream. For example, the particles may be filtered from the fluid stream, electromagnetically removed from the fluid stream, or removed by flocculation, among other techniques.

The separated particles may be heated to reverse any particles that have undergone a phase change. Further, the fluid stream may be heated to reverse any particles that have undergone a phase change. Other techniques may be used to heat the fluid stream, for example, the fluid stream may be heated by collapsing a gas cap in a reservoir, downstream equipment, or both.

The particles may be handled or modified in various ways. For example, fresh particles may be added to make up for lost particles. Further, a surface of the particles may be modified to become more hydrophilic or more hydrophobic. At least about 50 ppm of the particles may be injected into the fluid stream. A density of the particles to match a target phase, interface or both. The injection of the particles may also be used to melt a clathrate deposit, a wax deposit, or both.

Another embodiment provides a system for protecting a fluid transportation system from fouling. The system includes particles comprising a phase change material, an injection manifold configured to inject the particles into a fluid stream, a separation system configured to remove the particles from the fluid stream. The system also has a heating system configured to heat the particles to reverse a phase change, either before or after separation. A mixing system can be included to add more particles.

An injection line may be configured to transport a slurry of the particles to the injection manifold. A static mixer may be configured to mix the particles with the fluid stream, for example, at the injection manifold as well as at other points in the fluid stream.

The particles may include microencapsulated particles of the phase change material.

The phase change material can include an inorganic material, an organic material, a eutectic blend, or any combinations thereof. For example, the phase change material may include a salt hydrate, or a eutectic solution. Other exemplary phase change materials can include a fatty acid, a wax, an oil, a polyglycol, an organic material, or any combinations thereof. The phase change material may include materials that form a clathrate hydrate at a selected temperature.

Another embodiment provides a method for protecting a subsea production line from fouling. The method includes transporting a slurry of particles to an injection manifold on a subsea line, wherein the particles comprise a phase change material. The particles are injected into a fluid stream in the subsea line and the fluid stream is transported to a processing facility at the surface. The particles are separated from the fluid stream. The particles are heated to recharge the phase change material, either before or after separation from the fluid stream and are then recycled back to the injection manifold.

The particles may be modified to create a hydrophobic surface configured to enhance a concentration of the particles in a hydrocarbon phase. Alternatively, the particles may be modified to create a hydrophilic surface configured to enhance a concentration of the particles in an aqueous phase. The particles may be modified to move to an interface in a low shear condition. More particles may be added to compensate for particles lost during transportation and separation.

Another embodiment provides a method for melting clathrate solids or wax solids, comprising injecting phase change materials (PCMs) in a carrier fluid into a production line. The clathrate solids or wax solids may be below a solid equilibrium temperature.

Further, the PCM injection may include the injection of thermodynamic hydrate inhibitors (THIs), warm fluids, or combinations thereof. The production fluid may be actively heated. The production line may be depressurized.

DESCRIPTION OF THE DRAWINGS

The advantages of the present techniques are better understood by referring to the following detailed description and the attached drawings, in which.

DETAILED DESCRIPTION

Figure 1A:
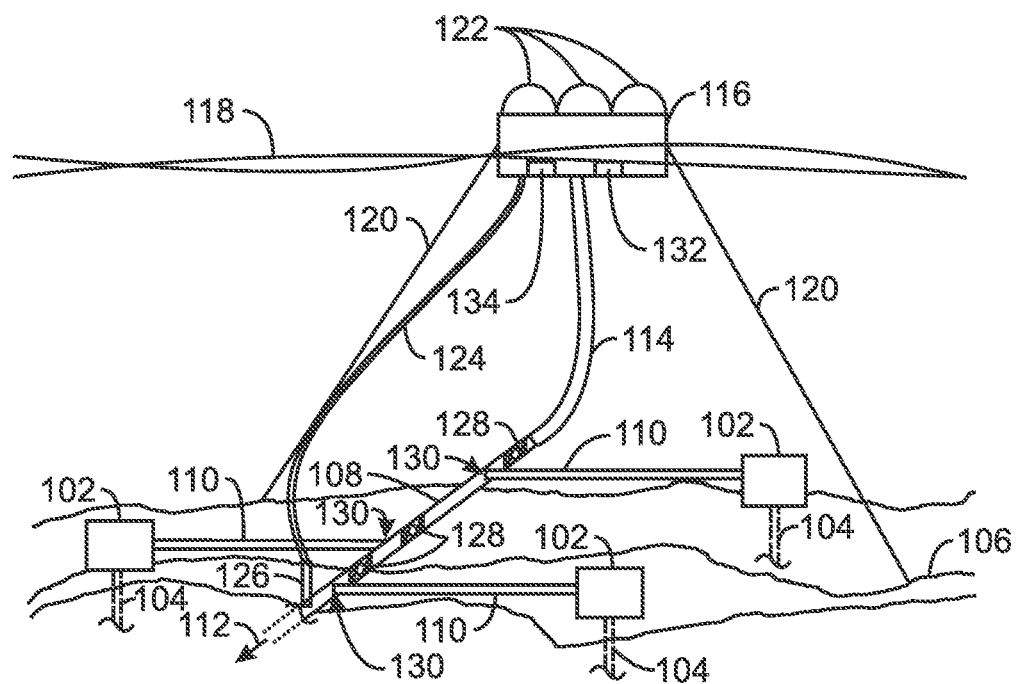
FIG. 1(A) is an illustration of a subsea natural gas field that can be protected from solids formation.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "clathrate" is a weak composite made of a host compound that forms a basic framework and a guest compound that is held in the host framework by intermolecular interaction, such as hydrogen bonding, Van der Waals forces, and the like. Clathrates may also be called host-guest complexes, inclusion compounds, and adducts. As used herein, "clathrate hydrate," "clathrate," and "hydrate" are interchangeable terms used to indicate a clathrate having a basic framework made from water as the host compound. A clathrate is a crystalline solid which looks like ice and forms when water molecules form a cage-like structure around a "clathrate-forming constituent."

A "clathrate-forming constituent" refers to a compound or molecule in petroleum fluids, including natural gas, which forms clathrate at elevated pressures and/or reduced temperatures. Illustrative clathrate-forming constituents include, but are not limited to, hydrocarbons such as methane, ethane, propane, butane, neopentane, ethylene, propylene, isobutylene, cyclopropane, cyclobutane, cyclopentane, cyclohexane, and benzene, among others. Clathrate-forming constituents can also include non-hydrocarbons, such as oxygen, nitrogen, hydrogen sulfide, carbon dioxide, sulfur dioxide, and chlorine, among others.

A "facility" as used herein is a representation of a tangible piece of physical equipment through which hydrocarbon fluids are either produced from a reservoir or injected into a reservoir. In its broadest sense, the term facility is applied to any equipment that may be present along the flow path between a reservoir and the destination for a hydrocarbon product. Facilities may comprise production wells, injection wells, well tubulars, wellhead equipment, gathering lines, manifolds, pumps, compressors, separators, surface flow lines, and delivery outlets. In some instances, the term "surface facility" is used to distinguish those facilities other than wells. A "facility network" is the complete collection of facilities that are present in the model, which would include all wells and the surface facilities between the wellheads and the delivery outlets.

A "formation" is any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest.

The term "FSO" refers to a Floating Storage and Offloading vessel. A floating storage device, usually for oil, is commonly used where it is not possible or efficient to lay a pipe-line to the shore. A production platform can transfer hydrocarbons to the FSO where they can be stored until a tanker arrives and connects to the FSO to offload it. A FSO may include a liquefied natural gas (LNG) production platform or any other floating facility designed to process and store a hydrocarbon prior to shipping.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that may include either a gas or vapor.

A "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are transported by pipeline, such as any form of natural gas or crude oil. A "hydrocarbon stream" is a stream enriched in hydrocarbons by the removal of other materials, such as water.

"Kinetic hydrate inhibitor" refers to a molecule and/or compound or mixture of molecules and/or compounds capable of decreasing the rate of clathrate nucleation and formation in a petroleum fluid that is either liquid or gas phase. A kinetic hydrate inhibitor can be a solid or liquid at room temperature and/or operating conditions. The clathrate formation rate can be reduced sufficiently by a kinetic hydrate inhibitor such that no clathrates form during the time fluids are resident in a pipeline at temperatures below the clathrate formation temperature.

For the inhibition of clathrate formation by thermodynamic or kinetic hydrate inhibitors, the term "minimum effective operating temperature" refers to the temperature above which clathrates do not form in fluids containing clathrate forming constituents during the time the fluids are resident in a pipeline. For thermodynamic inhibition only, the minimum effective operating temperature may be equal to the thermodynamically inhibited clathrate formation temperature. For a combination of thermodynamic and kinetic inhibition, the minimum effective operating temperature may be even lower than the thermodynamically inhibited clathrate formation temperature by itself.

"Liquefied natural gas" or "LNG" is natural gas that has been processed to remove impurities (for example, nitrogen, and water and/or heavy hydrocarbons) and then condensed into a liquid at almost atmospheric pressure by cooling and depressurization.

The term "natural gas" refers to a multi-component gas obtained from a crude oil well (termed associated gas) or from a subterranean gas-bearing formation (termed non-associated gas). The composition and pressure of natural gas can vary significantly. A typical natural gas stream contains methane ($CH_4$) as a significant component. Raw natural gas will also typically contain ethylene ($C_2H_4$), ethane ($C_2H_6$), other hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

A "phase change material" is a material that absorbs or emits energy while undergoing a phase change. Such materials can be used to store heat energy during one period of time and then release the heat energy at another time. Phase change materials may include organic PCMs, inorganic PCMs, and eutectic PCMs, among others. Some PCMs are also referred to as "thermal salts", such as "29T". Organic PCMs that may be used in embodiments include paraffins, fatty acids, and mixtures thereof. Inorganic PCMs that may be used in embodiments include salt hydrates, for example, having the formula $M_n H_2 O$. An example of an inorganic PCM is discussed further with respect to the example below. Eutectic PCMs that may be used in embodiments include mixtures of organic compounds with other organic compounds, organic compounds with inorganic compounds, and inorganic compounds with inorganic compounds.

In addition to these materials, clathrates of materials having a higher equilibrium temperature than target compounds may be selected for a PCM. For example, the ingredients for a hydrocarbon clathrate hydrate, such as a hydrocarbon and water, may be enclosed in microencapsulated particles. In this case, as the clathrate forms and releases energy, it may raise the temperature of a colder production fluid and prevent the formation of other clathrates or wax precipitation. The choice of materials may be made on the basis of phase change temperature, heat released during the phase change, and the number of cycles that a material may be reused, among others. Accordingly, any material that meets these characteristics may be used.

"Pressure" is the force exerted per unit area by the fluid on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia).

"Production fluid" refers to a liquid and/or gaseous stream removed from a subsurface formation, such as an organic-rich rock formation. Produced fluids may include both hydrocarbon fluids and non-hydrocarbon fluids. For example, production fluids may include, but are not limited to, oil, natural gas, and water.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

"Thermodynamic hydrate inhibitor" refers to compounds or mixtures capable of reducing the clathrate formation temperature in a petroleum fluid that is either liquid or gas phase. For example, the minimum effective operating temperature of a petroleum fluid can be reduced by at least 1.5° C., 3° C., 6° C., 12° C., or 25° C., due to the addition of one or more thermodynamic hydrate inhibitors. Generally the THI is added to a system in an amount sufficient to prevent the formation of any clathrate.

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, or open-hole well, and may be any type, including, but not limited to a producing well, an experimental well, and an exploratory well, or the like. A well may be vertical, horizontal, or any angle between vertical and horizontal (a deviated well), for example a vertical well may comprise a non-vertical component.

Overview

Embodiments disclosed herein provide methods and systems that can help in protecting hydrocarbon transportation systems, such as undersea pipelines, from flow restrictions due to the formation of clathrate hydrates or wax precipitates. A stream containing particles of a phase change material, for example, in microcapsules, is added to a produced fluid at a first point in the transportation system. The phase change material emits heat, i.e., is exothermic, during its change in phase and can be selected to have a phase change onset equal to or several degrees higher in temperature than the clathrate equilibrium temperature or wax appearance temperature.

Accordingly, the heat released from the particles can protect against the formation of clathrate hydrates by keeping the temperature of the material in a pipeline above the formation temperature of the clathrates. The same effect may protect against the precipitation of wax or other hydrocarbon materials during the transportation. The particles may be treated to preferentially separate into a target phase. For example, if protection from clathrates is desirable, the particles may be treated to have a hydrophilic surface or coating, generally causing the separation of the particles into the water phase. If protection against wax formation is desired, the particle may be treated to have a hydrophobic surface or coating, generally causing the particles to move into the hydrocarbon phase. To protect from both effects, a mixture of particles may be used. The density of the particles may be adjusted to substantially match the target phase, preventing settling of the particles.

After the produced fluid leaves the transportation line, the microencapsulated particles may be removed from the produced fluid, for example, by filtration, among other techniques. The microencapsulated particles are then warmed for recharging and returned to the injection point for reinjection. A typical use would be to protect subsea lines from a production field to a Floating Storage and Offloading vessel (FSO), as discussed with respect to FIG. 1(A). However, the applications are not limited to this, as the present techniques may be used in any transportation or production environment that is susceptible to clathrate or wax formation, including subsea to shore pipelines, on-shore pipelines, wells, oil from oil sands, natural gas, or any number of liquid or gaseous hydrocarbons from any number of sources, and the like.

FIG. 1(A) is an illustration of a subsea field 100 that can be protected from solids formation in an embodiment. The field 100 can have a number of wellheads 102 coupled to wells 104 that harvest hydrocarbons from a formation (not shown). As shown in this example, the wellheads 102 may be located on the ocean floor 106. Each of the wells 104 may include single wellbores or multiple, branched wellbores. Each of the wellheads 102 can be coupled to a central pipeline 108 by gathering lines 110. The central pipeline 108 may continue through the field 100, coupling to further wellheads 102, as indicated by reference number 112. A flexible line 114 may couple the central pipeline 108 to a collection platform 116 at the ocean surface 118. The collection platform 116 may be, for example, a floating processing station, such as a floating storage and offloading unit (or FSO), that is anchored to the sea floor 106 by a number of tethers 120.

For hydrocarbon processing, the collection platform 116 may have equipment for dehydration, purification, oil/water separation, oil/gas separation, and the like, such as storage vessels 122. The collection vessel 116 may transport the processed hydrocarbons to shore facilities by pipeline (not shown).

Prior to processing of the hydrocarbons on the collection platform 116, the collected hydrocarbons may cool and form solids, such as clathrates or wax precipitates, in various locations, such as the collection pipeline 108, the gathering lines 110, or the flexible line 114, among others. The formation of the solids may lead to partial or even complete plugging of the lines 108, 110, and 114. Similarly, in on-shore fields, clathrates and wax can plug wells, gathering lines, and collection lines.

In an embodiment, a microencapsulated phase change material is added to mitigate the formation of the solids, for example, from the collection vessel 116 by a line 124 to one or more injection points, such as at injection manifold 126. Although the line 124 is shown as being independent of the flexible line 114, the line 124 may be incorporated along with the flexible line 114 and other production, utility, and sensor lines into a single piping bundle. In various embodiments, the injection manifold 126 may be located on the collection pipeline 108, the gathering lines 110, the flexible line 114, or on any combinations thereof.

The amount of particles to be used may be determined by analyzing or monitoring the water or hydrocarbon production rates in the production fluids. The amount may be controlled so that the temperature of the production fluid is stabilized above an equilibrium temperature for the formation of clathrates or wax precipitates for a preselected period of time, as discussed herein. One or more static mixers 128 can be placed in the lines to assist in suspending or distributing the particles, for example, in the collection line 108 downstream of the entry points 130 for each of the gathering lines 110. The placement of the static mixers 128 is not limited to the collection line 108, as static mixers 128 may be placed in the flexible line 114, the gathering lines 110, the wellheads 102, or even down the wells 104. Placing an injection manifold 126 down a well, for example, upstream of a static mixer 128, may be useful for mitigating clathrate or wax formation in wellbores. After injection, the particles can be reclaimed through filters or flocculation units located on the collection vessel 116. The phase change material can then be regenerated by heating the particles, which can then be recycled through the line 124.

The concentration of components in the production fluids brought up the flexible line 114 from the connection pipe 108 may be monitored, for example, by an analyzer 132 located at the collection vessel 116 or at any number of other points in the natural gas field 100. The analyzer 132 may determine the concentration of the particles, clathrate forming components, the concentration of the phases in the production fluid, the amount of hydrocarbons present, the amount of microencapsulated particles present, or any combinations of these parameters. For example, a particle size analyzer may be included to analyze the differently refracting items in the production fluid, such as the particles and the hydrocarbon droplets. The output from the analyzer 132 may be used to control an addition system 134, which may be used to adjust the amount of microencapsulated particles, as well as other additives, sent to the injection manifold 126. In an embodiment, the configuration discussed above may be used to control the formation of clathrates and wax precipitates by controlling the amount of microencapsulated particles injected. The facilities and arrangement of the facility network is not limited to that shown in FIG. 1(A), as any number of configurations may be used in embodiments.

Figure 1B:
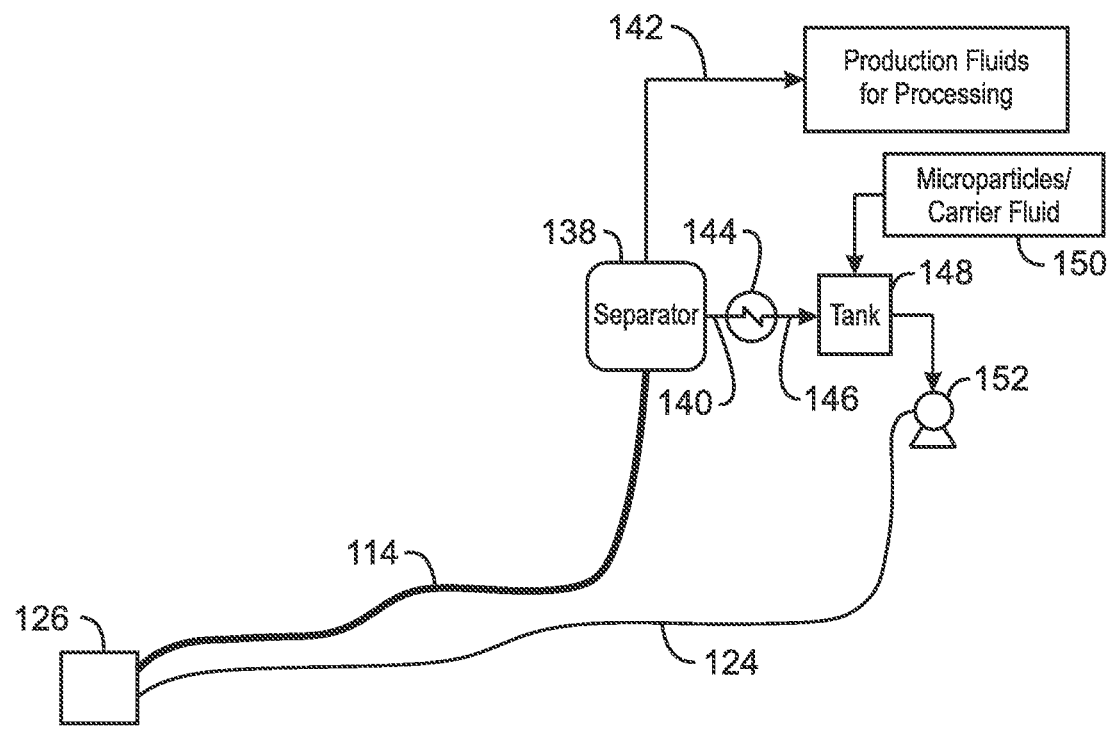
FIG. 1(B) is a block diagram of a system for injecting particles of a phase change material (PCM) into an oil and gas production pipe.

FIG. 1(B) is a block diagram of a system 136 for injecting particles of a phase change material into an oil and gas production pipeline. The system 136 has an injection line 124 to an injection manifold 126 that allows the injection of a slurry of the particles in a carrier fluid. A collection line 114 can transport the production fluids, including hydrocarbons, water, and the PCM containing particles back to the production facility 116. At the production facility 116, a separator 138 removes the particles 140 from the production fluids 142. The separator 138 may include any number of technologies, such as magnetic or electromagnetic separation, filtration, flocculation, or other methods for separating solids from liquids. The particles 140 can then be passed through a heater 144 to recover lost sensible and latent heat, i.e., heat associated with the heat capacity of the solution and heat of the phase change, respectively. The heat may be added at other points in the process. For example, the fluid stream may be heated by collapsing a gas cap in a reservoir, downstream equipment, or both. As the gas from a reservoir cools, it may be able to exothermally condense to a liquid in a pipeline, thereby providing some heat for regenerating the phase change particles. This may be performed, for example, by depressurizing a production line to allow the gas to cool.

The heated particles 146 are added to a preparation tank 148, where additional particles or carrier fluid 150 can be added to make up for materials lost in processing. The preparation tank 148 may be heated in addition to, or instead of, using a separate heater 144. Further, the new stream of particles and carrier fluid 150 are heated to warm the particles 146. From the preparation tank 148, an injection pump 152 can be used to return the slurry to the injection manifold 126 through the injection line 124.

Figure 2:
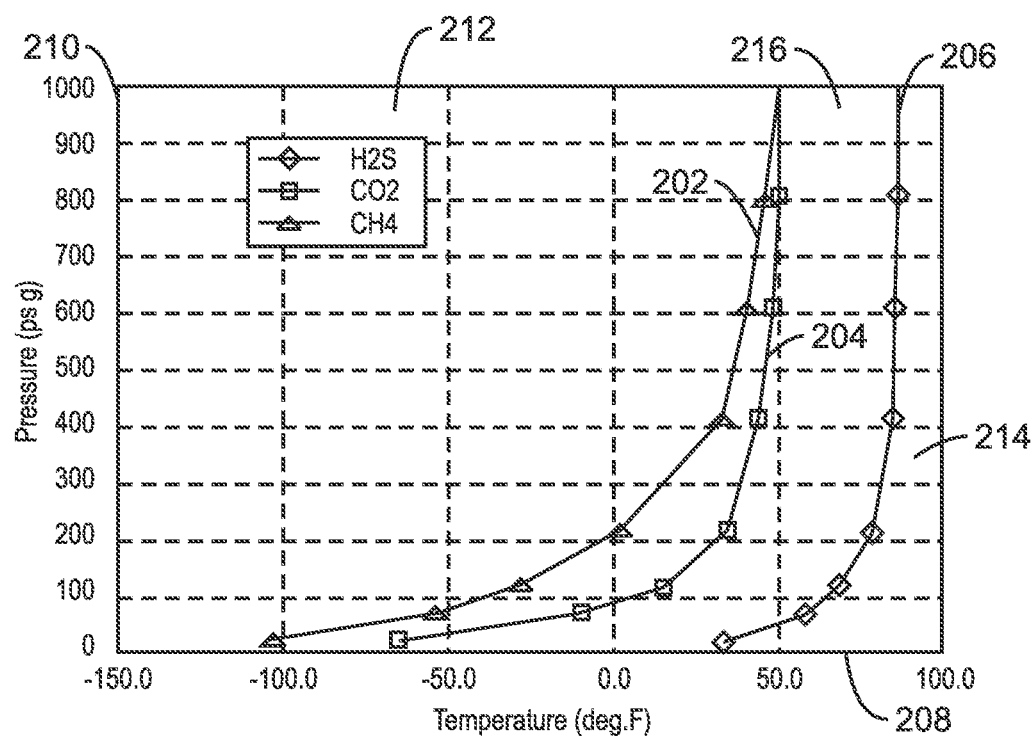
FIG. 2 is a graph of the clathrate equilibrium curves for methane, carbon dioxide, and hydrogen sulfide.

FIG. 2 is a graph 200 of the clathrate equilibrium curves for methane 202, carbon dioxide 204, and hydrogen sulfide 206, in accordance with an exemplary embodiment of the present techniques. In the graph 200, the x-axis 208 represents the temperature of a system in degrees Fahrenheit, while the y-axis 210 represents the pressure of the system in pounds per square inch, gauge (psig). The equilibrium curves indicate the pressure and temperature point at which the clathrate is in equilibrium with the individual components, for example, water, and a particular gas. In a first region 212, generally at higher pressure and lower temperatures, formation of the clathrates of all components, including methane and other hydrocarbons, may occur. In a second region 214, generally at lower pressures and higher temperatures, the decomposition of the clathrates of all components may occur. Generally, a gas mixture containing multiple components, e.g., methane and ethane, will have an equilibrium curve similar to that for the pure components 202 and 206, but will be located in region 216 between the pure component curves. In regions between the curves, such as region 216, formation of one clathrate, such as a clathrate of $H_2S$ 206 may occur, while another clathrate, such as a clathrate of methane 202, may decompose. Thus, a phase change material may be selected based, at least in part, on the composition of the materials in the hydrocarbon stream.

Figure 3:
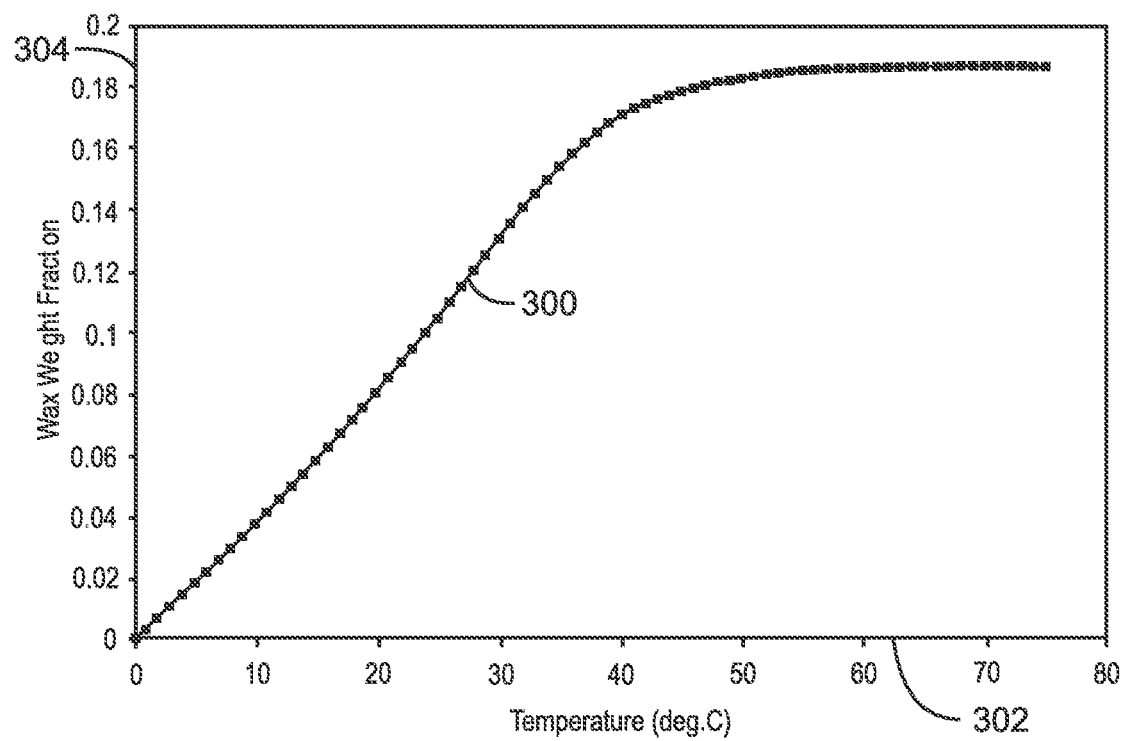
FIG. 3 is a representative solubility curve for wax in a crude oil matrix.

FIG. 3 is a representative solubility curve 300 for wax in a crude oil matrix. The x-axis 302 represents the temperature in degrees Celsius, while the y-axis 304 represents the weight fraction of a wax that may be dissolved in the crude. It will be clear that this curve 300 is merely an example. The curve 300 may shift depending on the composition of the crude oil and the wax. As can be seen by the curve 300, lowering the temperature of the crude oil will lower the amount of wax that can be dissolved in the crude oil. If the crude oil temperature drops below a temperature at which the crude oil can hold the amount of wax that is currently in solution, wax will plate out until the concentration reaches equilibrium. Accordingly, adding a phase change material to the oil phase of the crude oil may assist in keeping the temperature sufficiently high to avoid plate out before reaching a destination.

Figure 4:
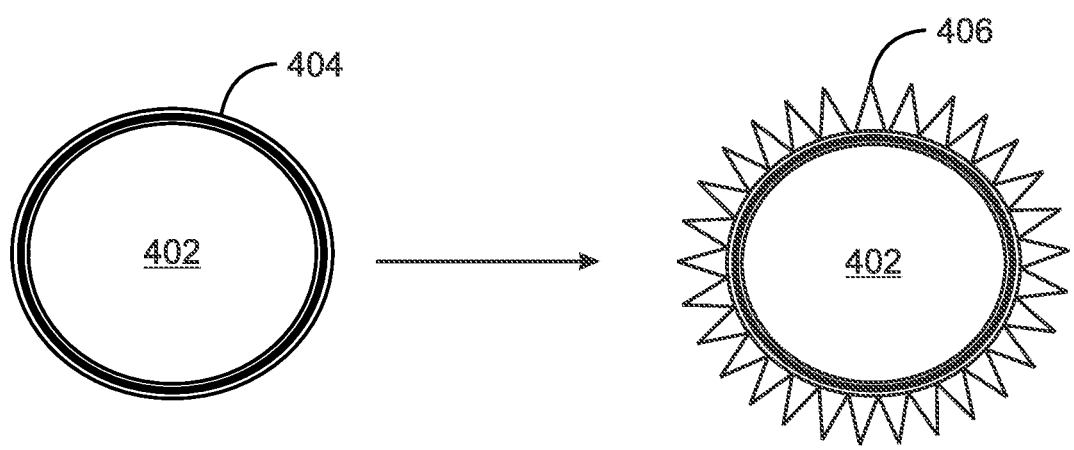
FIG. 4 is a drawing of a microencapsulated particle containing a phase change material.

FIG. 4 is a drawing of a particle 400 containing a phase change material 402. The particle 400 may have a diameter between about 0.5 µm and about 1000 µm. Any number of materials may be used as the phase change material (PCM) 402, as discussed herein.

The surface 404 of the microencapsulated particle 400 can be formed from glass, quartz, polymer, or any other material that can keep liquid ingredients isolated from the production fluids. Further, the surface 404 can be modified to form a new surface 406 that can increase the concentration of the particles 400 in a target phase. For example, the modified surface 406 may be more hydrophilic than the original surface, driving the particles 400 to preferentially enter a water phase. This may be performed, for example, by treating glass enclosed particles with an etching solution of sulfuric acid ($H_2SO_4$) and hydrogen peroxide ($H_2O_2$). This solution can hydroxylate the surface of the glass by increasing the number of silanol groups, making the surface more hydrophilic. Other materials may be made more hydrophilic using similar techniques, such as reacting the surface 404 of a plastic material with a milder hydroxylation solution, such as Fenton's reagent (hydrogen peroxide containing an iron catalyst). Other techniques, such as plasma etching, may also be used.

In addition to being made more hydrophilic, the surface 404 may be made more hydrophobic to force particles to preferentially enter a hydrocarbon phase. This may be performed by any number of techniques known in the art. For example, a surface 404 may first be hydroxylated to increase the number of —OH groups. The hydroxylated particles 400 may then be reacted with a fatty acid in the presence of a strong acid or base to form an ester at the surface, attaching the fatty acids. The hydrophobic particles 400 may then be removed into an oil phase and used in various embodiments as described herein.

For clathrate inhibition, the particles 400 may be suspended in a water soluble liquid for transport so that the material is water wet and occupies the aqueous phase. For wax inhibition, the particles 400 may be transported in an oil soluble phase to carry the particles to the oil phase. In this way, the particles 400 can be located in the phase where they may have optimal effect.

The particles 400 may also be modified to facilitate their separation from the hydrocarbon. For example, the particles 400 may include a ferromagnetic core or shell, such as iron, to allow magnetic separation to be used.

FIG. 5 (A) is a plot showing the temperature 502 of a system during the formation of a solid in an exothermic process as the system cools. The x-axis 504 represents time, while the y-axis 506 represents temperature. The time that the temperature 502 cools from a starting temperature 508 to the equilibrium temperature 510 may be termed the "no touch time" 512 and is the time during which no solids formation may occur. Once below the hydrate equilibrium, there may be some additional time required for nucleation, which is not included in the "no-touch time." Thus, cooling will continue until the temperature 502 reaches an onset temperature 514. The onset temperature 514 may be at the equilibrium temperature 510, or may be lower, depending on whether subcooling has occurred in the system. Once the onset temperature 514 is reached, solids formation starts and the temperature 502 returns to the equilibrium temperature 510 as heat is released during the phase change. The temperature 502 remains at the equilibrium temperature 510, as indicated by the plateau 516, until the solids-forming components, e.g., the water, gas, or paraffinic hydrocarbons, e.g., waxes, are exhausted.

In an embodiment, the system contains a suspension of microparticulate material that includes an exothermic phase change material (PCM), for example, as described herein. As it changes phases, the PCM can release heat to the surrounding fluid. The effect of this characteristic is discussed with respect to FIG. 5(B).

Figure 5A:
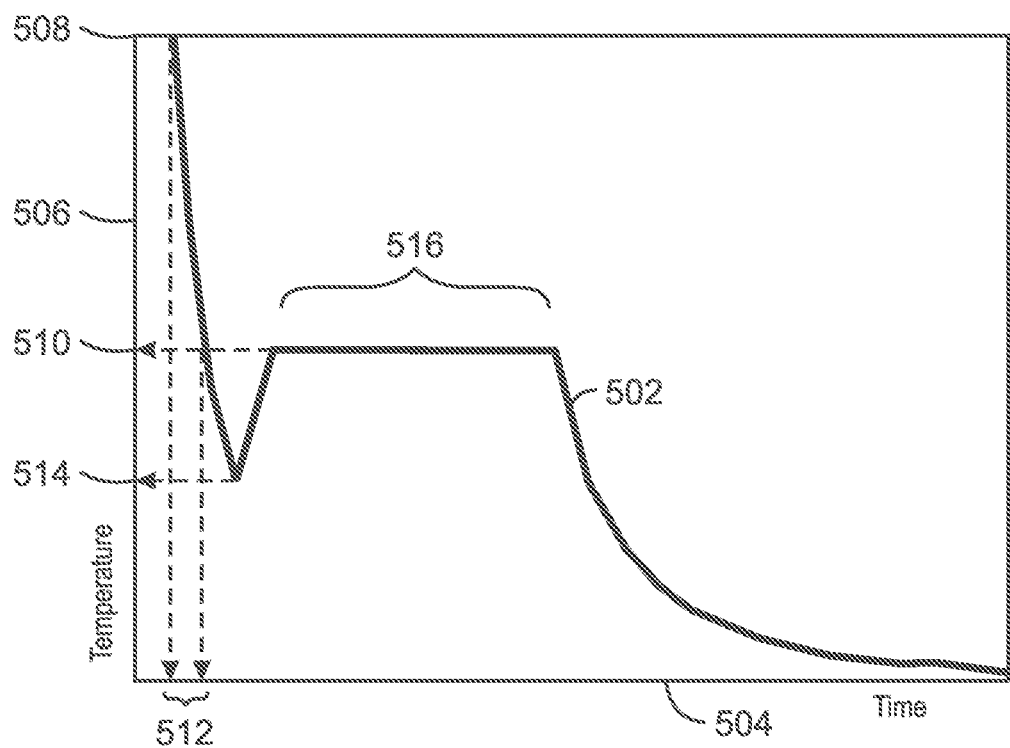
FIG. 5(A) is a plot showing the temperature of a system during the formation of a solid in an exothermic process as the system cools.
Figure 5B:
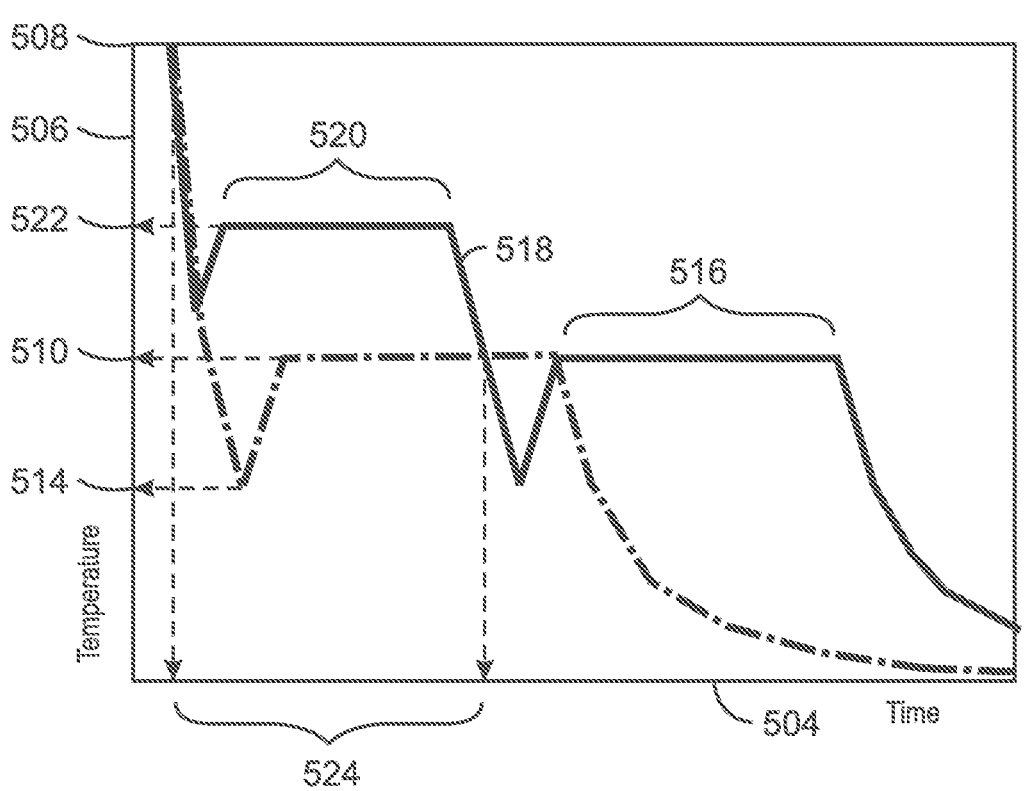
FIG. 5(B) is a plot showing the temperature of a system containing a PCM during the formation of a solid in an exothermic process as the system cools.

FIG. 5 (B) is a plot showing the temperature 518 of a system containing a PCM in an exothermic process as the system cools. The axes are as defined with respect to FIG. 5(A). As shown in FIG. 5(B), the temperature 518 drops and holds at a first plateau 520 during which the PCM solidifies. The equilibrium temperature 522 for the PCM solidification is selected to be higher than the equilibrium temperature 510 and, thus, prevents the formation of solid wax or clathrates. Generally, once the PCM is exhausted, i.e., all of the PCM in the system has solidified, the temperature 518 will resume falling. As a result, the touch time 524 at which the system has cooled from the initial temperature 508 to the equilibrium temperature 510 can be substantially extended beyond the touch time 512 discussed with respect to FIG. 5(A). After the PCM is exhausted, the cooling curve may then follow the profile discussed with respect to FIG. 5(A). The extended touch time 524 may depend on multiple factors, including, for example, the latent heat of the phase change, which is the energy released during a phase change per mass of the PCM.

The phase changes described above are not very conservative, and may be more applicable in situations of rapid cooling or good mixing. However, during shut-in, there may be some areas of localized cooling that may not require conversion of all PCM before the temperature falls into the solid formation region. For this reason, it may be desirable to condition PCMs to separate to an interface in low shear conditions. For example, hydrate nucleation usually occurs at the water-gas or water-oil interface and, thus, particles that rise to the top of the water to protect that interface. Further, adding PCMs may warm up the production fluid if it is below its equilibrium temperature 522. Thus, PCMs may be introduced in a carrier fluid into a line containing hydrate or wax to melt these materials.

Other factors may include the amount of phase change material in the system, and the amount of phase change material that has already changed phases, thereby releasing heat. This is further discussed with respect to the example, below. One advantage to using a particulate phase change system is that energy that is transferred to the production fluid during fluid transport can be recharged to the particulate material by active heating further down the process where it is easier to manage. In this way, the microparticles act as miniature heaters with a temperature-conditioned on-switch which can be recharged and reused.

Figure 6:
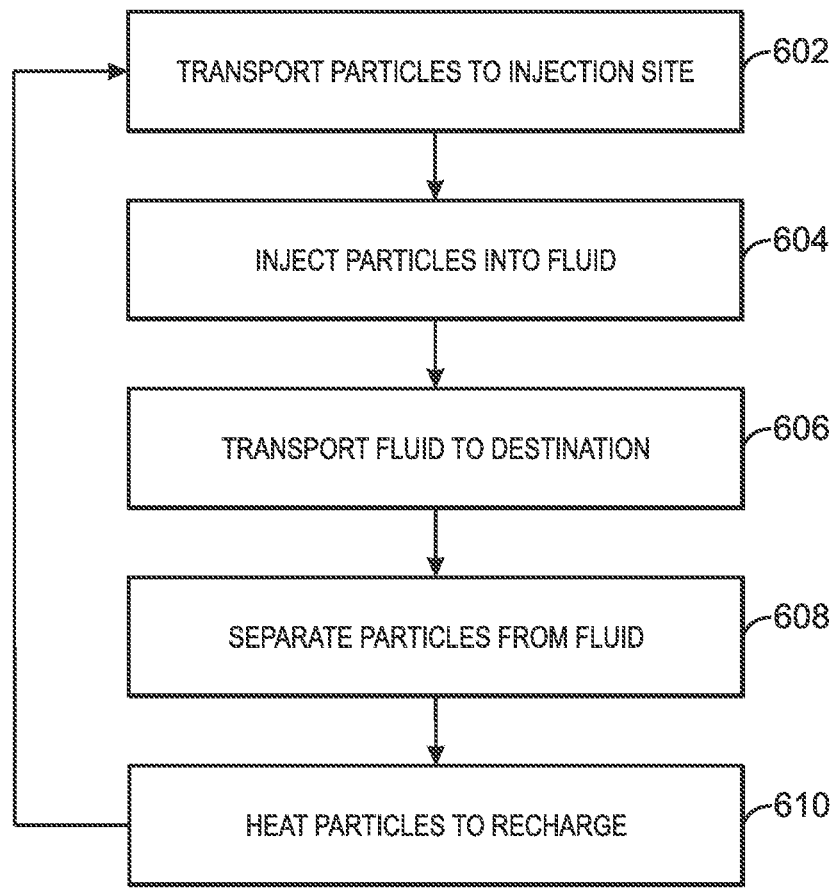
FIG. 6 is a method for using PCM particles to mitigate wax or clathrate formation in a pipeline.

FIG. 6 is a method 600 for using PCM particles to mitigate wax or clathrate formation in a pipeline. The method begins at block 602 with the transportation of charged particles to the injection site, for example, in a slurry with a carrier fluid. At block 604, the charged particles are injected into the fluids being transported. At block 606, the fluids are transported to the destination. During the transportation, a portion, or even all, of the particles undergo a phase change and release heat to the surrounding fluid, which may prevent the temperature from falling below a set point so long as some unchanged particles remain. At block 608, the particles are separated from the fluid, for example, by filtration or other techniques, as described above. At block 610, the particles are heated and any particles or carrier fluid lost in the process are replaced. It is not necessary for the particles to be separated from the fluid before heating. In some embodiments, the fluids may be heated to recharge the particles before separation. Further, this heating may be performed by ambient conditions, such as in a shallow section of a sub-sea pipeline, in which the temperatures are higher than in deeper sections. Process flow then returns to block 602, at which the refreshed particle slurry is transported to the injection site.

In one or more embodiments, the pumps utilized above are "low shear" pumps, such as twin screw, sliding vane, progressive cavity, that minimize the grinding of PCM particles.

In one or more embodiments, PCM microparticulates are injected into an annulus, which surrounds the production fluid pipeline, thereby keeping the production and PCM streams from intermingling. In alternative embodiments, the annulus surrounds one or more portions of the production fluid pipeline. The annulus permits simpler PCM recovery and fluid processing and would allow for better thermal protection of the production fluids. It would also allow the PCMs to flow at a separate rate than the production fluids, which would allow for more operational control, such as during production shut-in, the PCMs could potentially still flow, allowing for long term, or indefinite, thermal protection of the production fluids. Thus, even during shut in, a PCM composition can be continuously circulated, allowing for continuous thermal maintenance of the pipeline and extending allowable shut-down times beyond that provided by conventional insulation.

Thermal control is obtained by increasing the pump rate of PCMs into the annulus and/or by increasing the particulate regeneration energy. By controlling these rates, flow of PCM is optimized by the outlet temperature of the production flow stream.

PCMs can be injected into an annulus in a flow direction concurrent with the production fluids or in a flow direction counter current to the production fluids.

In one or more embodiments, the PCM microparticles and systems described above are used with production pipelines that have one or more portions having conventional pipeline insulation.

In one or more embodiments, the annulus of a pipeline is charged with PCM microparticles and shut in during normal production of hydrocarbons, thereby serving a PCM insulation layer which can be circulated as needed, e.g., during production shut in scenarios.

Figure 1C:
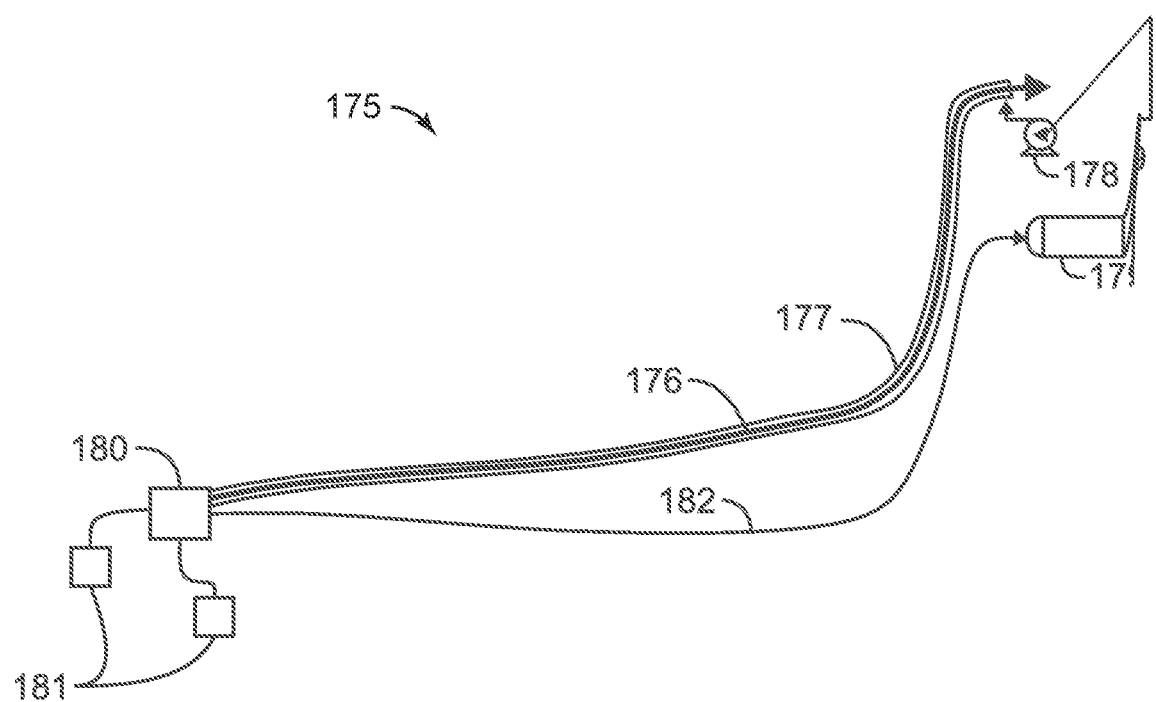
FIG. 1(C) is a diagram of a system for injecting particles of a phase change material (PCM) into an annulus of an oil and gas production pipe.

FIG. 1(C) is a diagram of a system 175 for injecting particles of a phase change material into an oil and gas production pipeline. The system 175 includes a production stream pipeline 176, which includes a pipeline annulus 177, a pump 178, a PCM source or an optional PCM regenerator 179, a production manifold 180, one or more production wells 181, and an optional PMC return umbilical 182. Although annulus 177 is shown as covering the entire production stream pipeline 176, alternative configurations have the annulus 177 only covering one or more portions of the pipeline 176.

The PCM regenerator 179 includes convention PCM slurry regeneration devices. PCM generators include heaters, including combustion, solar, or other heating equipment. In one or more embodiments, a large reservoir of PCMs is submerged in a vessel below sea level. In warmer water, PCMs maintained near the surface would regenerate with minimal or no external heating.

In additional embodiments, one or more optional PCM diverters (not shown) are provided to divert PCM away from warm portions of the production stream pipeline 176. The PCM diverters permit the use of the entire length of annulus 177 during shut in or turn down operations while still avoiding use of PCMs on production fluids that are above a phase change temperature for a selected PCM.

FIG. 1(c) shows a counter current flow configuration. As shown in FIG. 1(c), a PCM slurry regenerator 179 provides PCMs to pump 178, which pumps PCMs through annulus 177 in a counter current flow configuration. The PCMs flow through the annulus to the production manifold 180. The PCMs flow from manifold 180 to the PCM slurry regenerator 179 via return umbilical 182. The production stream pipeline 176 transports the production fluids, e.g., hydrocarbons and water, back to a production facility.

In one or more embodiments, PCM microparticulates are injected into jacketed areas of a production system where temperature maintenance is important. For example, PCMs could be pumped to jumpers, valve assemblies, chokes, or pipeline dips.

EXAMPLES

Example 1

The following hypothetical examples assume the use of a commercially available microencapsulated phase change material (PCM) named "Latest™ 18T," (hereinafter "18T") which is available from PCM Energy P. Ltd, of Mumbai, India. The properties of the 18T are shown in Table 1. The test condition was assumed to be a production fluid flowing through a 10 in. (25.4 cm) pipeline with ambient temperature outside of the pipe of 4° C. A flowing condition is discussed with respect to FIG. 7.

TABLE 1

| Properties of Latest ™ 18T | |
|---|---|
| Phase Change Temperature | 17-19° C. |
| Sub Cooling | 2° C. max |
| Specific Gravity | 1.48-1.50 |
| Latent Heat Practically | 175 Joules/g |
| Latent Heat Theoretical | 188 Joules/g |
| Specific Heat | 2 Joules/g ° C. |
| Thermal Conductivity | 1 Watt/m ° C. |
| Congruent Melting | Yes |
| Flammability | No |
| Hazardous | No |
| Thermal Stability | >10000 cycles |
| Maximum Operating Temperature | 100° C. |

Figure 7:
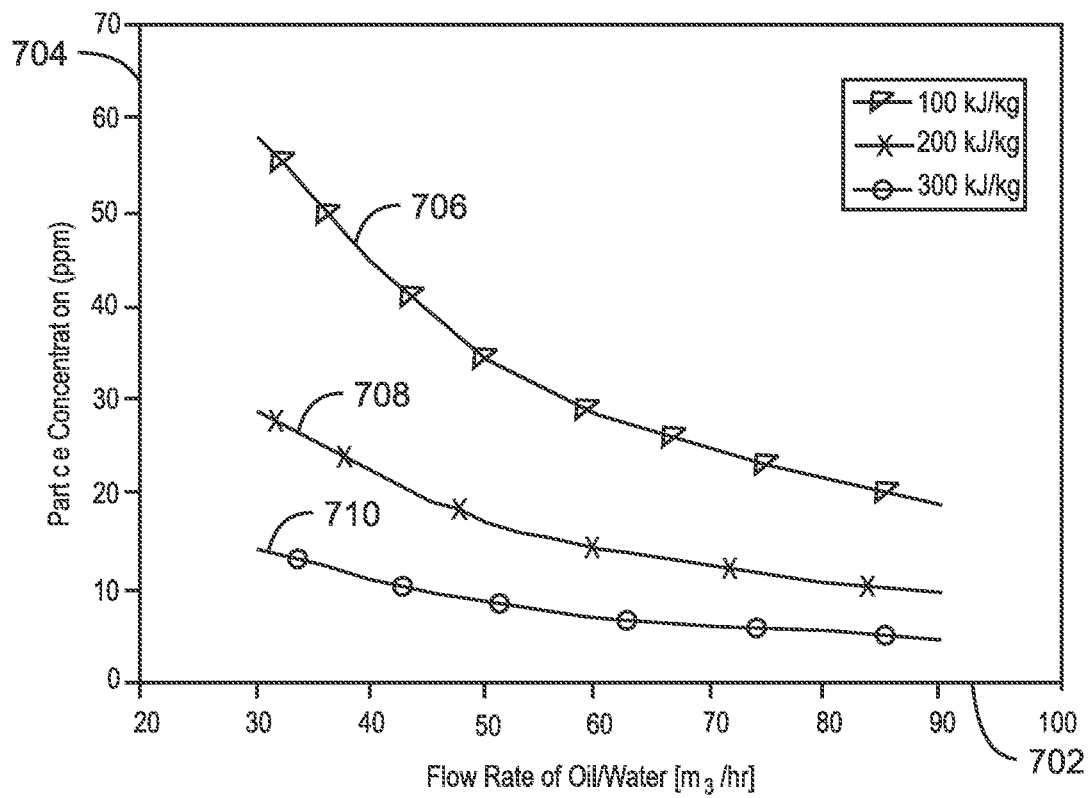
FIG. 7 is a plot of the particle concentrations of different latent heat capacity that would be used to maintain the temperature at 17° C. for 5 km.

FIG. 7 is a plot 700 of the particle concentrations of different latent heat capacity that would be used to maintain the temperature at 17° C. for 5 km. The x-axis 702 represents the flow rate through the line in m³/hr and the y-axis 704 represents the particle concentration in ppm by volume. The surface of the particles may be modified to select the water phase for clathrate mitigation or to select the oil phase for wax mitigation. In the example, the ability of other forms of energy to maintain temperatures at higher flow rates, i.e., frictional or internal energy, is considered. However, the ability to maintain temperatures at 17° C. for the entire 5 km may generally be attributed to the minimum number of particles in the fluid. The first curve 706 indicates the concentration of particles used if the latent heat released by the particles was 100 kJ/kg. The second curve 708 indicates the concentration of particles used if the latent heat released by the particles was 200 kJ/kg. The third curve 710 indicates the concentration of particles used if the latent heat released by the particles was 300 kJ/kg. The data indicates that higher flow rate reduces the concentration of particles needed to maintain temperature, since more phase change particles will pass through the 5 km section in the same amount of time. It may also be evident that greater latent heat offers greater protection. However, the greater latent heat provides a diminishing return at higher flow rates. The effects of the temperature maintenance from the particles may be more apparent in shut-in conditions.

Figure 8:
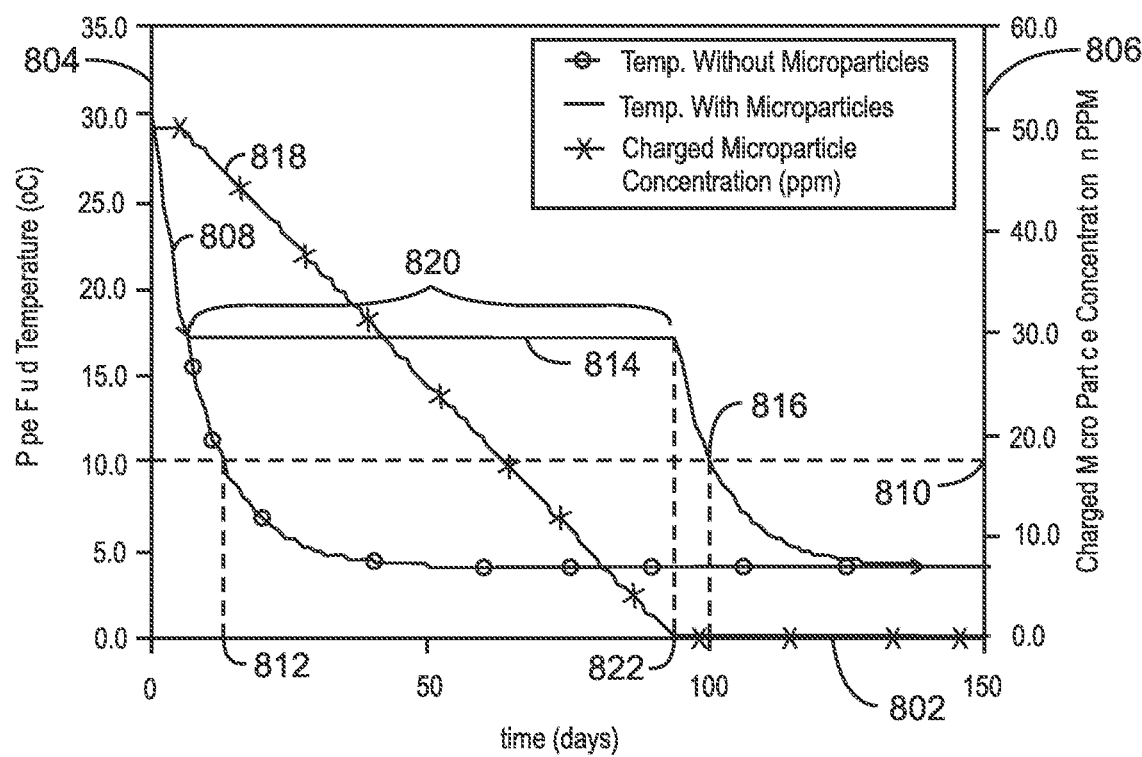
FIG. 8 is a plot of temperature versus time for a shut-in system with 50 ppm concentration of 175 kJ/kg phase change microparticles.

FIG. 8 is a plot 800 of temperature versus time for a shut-in system with 50 ppm concentration of 175 kJ/kg phase change microparticles. In the plot 800, the x-axis 802 represents the shut-in time in days, the left y-axis 804 represents the temperature of the fluid in the pipe in deg. Celsius, and the right y-axis 806 represents the particle concentration in ppm. In this example, an initially flowing system at 30° C. was effectively shut-in. A first curve 808 represents a cooling profile without any phase changes taking place, either in solids formation or in added PCMs. If the clathrate equilibrium temperature 810 is assumed to be 10° C., this temperature may be reached in about 12 days under these conditions, as indicated by reference number 812. However, as shown by the second curve 814, the addition of 50 ppm of particles may extend the time to reach 816 the equilibrium temperature to about 80 days. During this time, the concentration 818 of active particles is decreasing, while the temperature is holding steady on a plateau 820. Once the concentration 818 of active particles has decreased to zero, as indicated by reference number 822, the temperature 814 continues to fall to the equilibrium temperature 810. As above, this scenario may not be considered conservative since undistributed transient heat flow could occur without requiring all PCMs be at the PCM phase change temperature prior to complete conversion, e.g., it is more applicable in systems that have good mixing.

Figure 9:
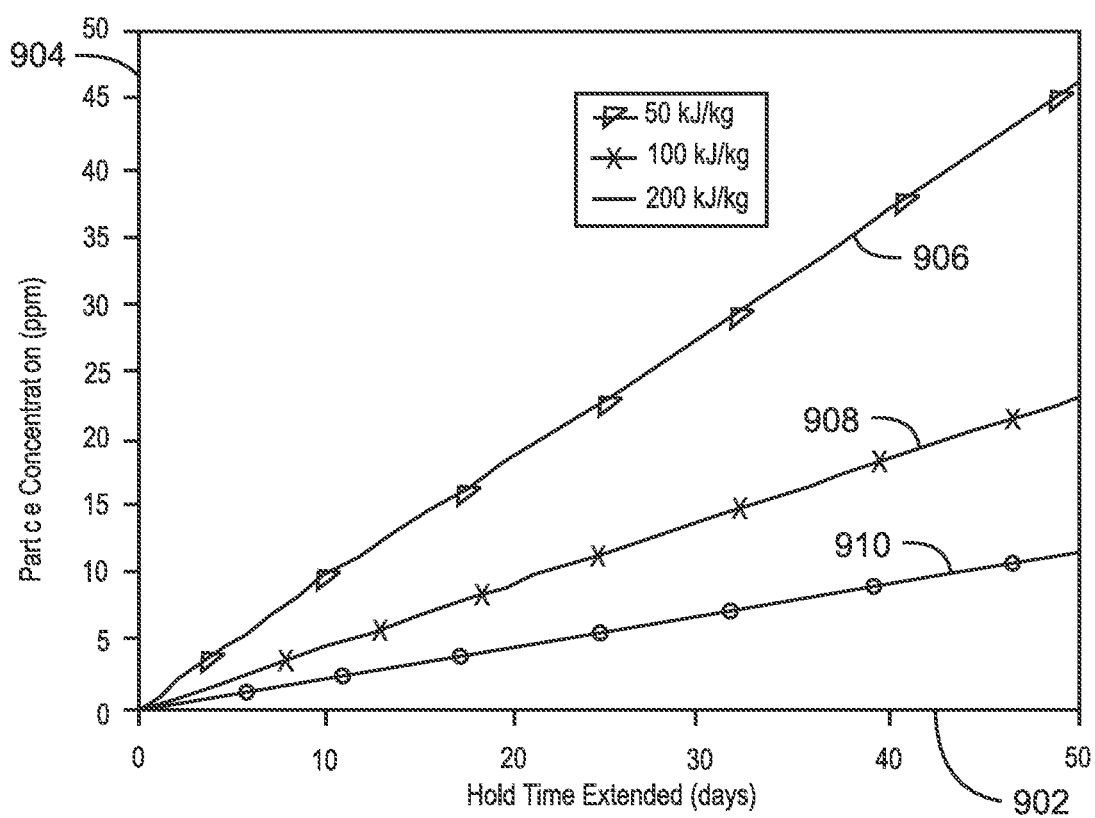
FIG. 9 is a plot showing the particle concentration versus the time to reach clathrate equilibrium for particles having different latent heats.

FIG. 9 is a plot showing the particle concentration versus the time to reach clathrate equilibrium for particles having different latent heats. The x-axis 902 represents the hold time in days, while the y-axis 904 represents the particle concentration in ppm. The first curve 906 shows the extension in hold time for particles having a 50 kJ/kg latent heat capacity. The second curve 908 shows the extension time for particles having a 100 kJ/kg latent heat capacity. The third curve 910 shows the extension in hold time for particles having a 200 kJ/kg latent heat capacity. The plot 900 may be used for determining appropriate concentrations of particles to be used for maintaining a particular temperature.

Example 2

The following hypothetical examples assume the use of the same commercially available microencapsulated phase change material (PCM) named "Latest™ 18T," as used in Example 1. The test condition was assumed to be a production fluid flowing through a five kilometer long, 10 in. (25.4 cm) pipeline with ambient temperature outside of the pipe of 4° C. The water volume fraction is 30% and the inlet temperature of the PCM slurry is 20° C., which is the PCM phase change temperature.

Figure 10:
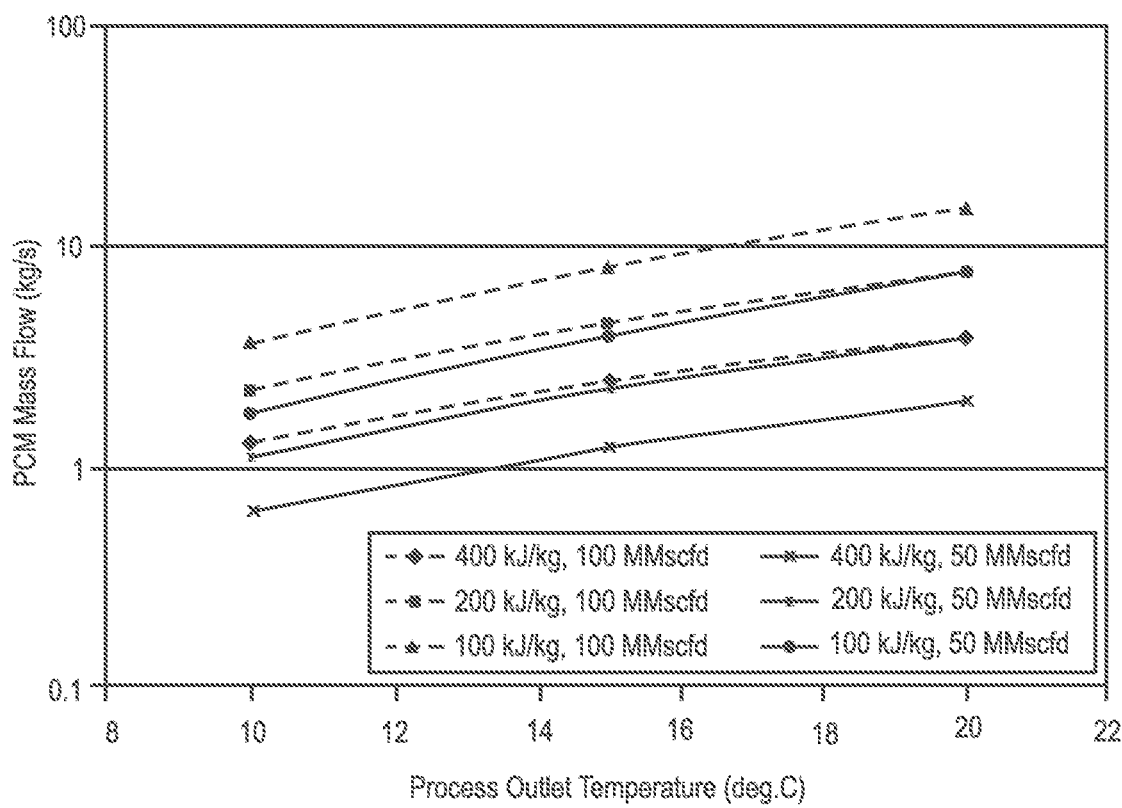
FIG. 10 is a plot showing gas process outlet temperature versus PCM mass flow rate.
Figure 11:
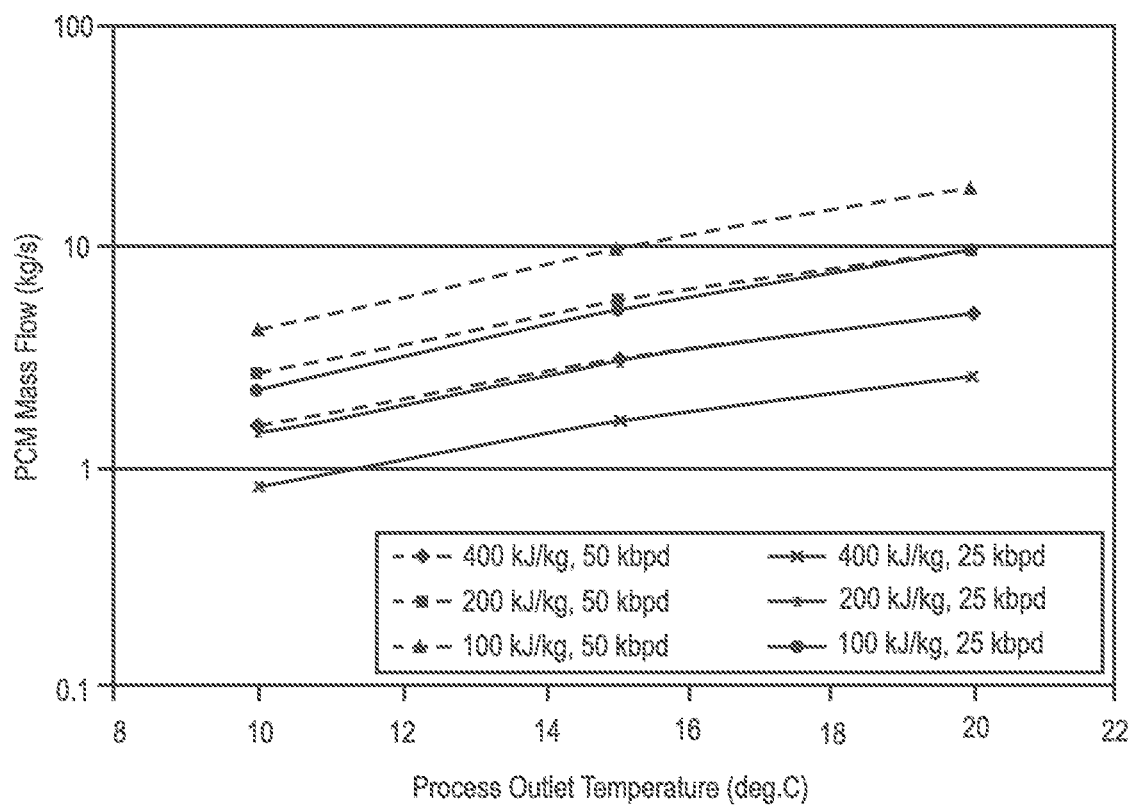
FIG. 11 is a plot showing oil process outlet temperature versus PCM mass flow rate.

FIG. 10 is a plot showing gas process outlet temperature versus PCM mass flow rate. FIG. 11 is a plot showing oil process outlet temperature versus PCM mass flow rate. FIGS. 10 & 11 show the mass flow rate of PCM of different latent heats that would be required to maintain a particular outlet process temperature for a gas dominant or liquid dominant process, respectively. The gas Cp is 2.99 kJ/kg-C and has a density of 87.52 kg/m3. The oil Cp is 2.36 kJ/kg-C and has a density of 540 kg/m3.

It is shown that a higher flow rate reduces the required concentration, since more PCM will pass through the 5 km pipe. Also, it is shown that a greater latent heat offers greater protection. In this example, the sensible heating will protect the process fluid for outlet temperatures below 20° C. The 20° C. cases are representative of temperature maintenance by microparticle latent heat.

While the present techniques may be susceptible to various modifications and alternative forms, the exemplary embodiments discussed above have been shown only by way of example. However, it should again be understood that the technique is not intended to be limited to the particular embodiments disclosed herein. Indeed, the present techniques include all alternatives, modifications, and equivalents falling within the true spirit and scope of the appended claims.

Embodiments

Embodiments of the invention may include any of the following methods and systems, among others, as discussed herein. This is not to be considered a complete listing of all possible embodiments, as any number of variations can be envisioned from the description above.

1. A method for protecting a fluid stream from fouling, comprising injecting particles into the fluid stream, wherein the particles comprise a phase change material configured to release energy at a selected temperature.

2. The method of embodiment 1, wherein the selected temperature is greater than a clathrate formation temperature in the fluid stream.

3. The method of embodiments 1 or 2, wherein the selected temperature is greater than a wax precipitation temperature.

4. The method of any of the previous embodiments, comprising transporting the particles to an injection site as a slurry.

5. The method of any of the previous embodiments, comprising separating the particles from the fluid stream.

6. The method of embodiment 5, comprising filtering the particles from the fluid stream.

7. The method of embodiment 5, comprising electromagnetically removing the particles from the fluid stream.

8. The method of embodiment 5, comprising flocculating the particles from the fluid stream.

9. The method of embodiment 5, comprising heating the separated particles to reverse any particles that have undergone a phase change.

10. The method of embodiment 1, comprising heating the fluid stream to reverse any particles that have undergone a phase change.

11. The method of embodiment 10, comprising heating the fluid stream by collapsing a gas cap in a reservoir, downstream equipment, or both.

12. The method of embodiment 5, comprising adding fresh particles to make up for lost particles.

13. The method of any of the previous embodiments, comprising modifying a surface of the particles to make the surface more hydrophilic.

14. The method of any of the previous embodiments, comprising modifying a surface of the particles to make the surface more hydrophobic.

15. The method of any of the previous embodiments, comprising injecting at least about 50 ppm of the particles into the fluid stream.

16. The method of any of the previous embodiments, comprising adjusting a density of the particles to match a target phase, interface or both.

17. The method of any of the previous embodiments, comprising melting a clathrate deposit, a wax deposit, or both.

18. A system for protecting a fluid transportation system from fouling, comprising:
 particles comprising a phase change material;
 an injection manifold configured to inject the particles into a fluid stream;
 a separation system configured to remove the particles from the fluid stream;

a heating system configured to heat the particles to reverse a phase change; and a mixing system configured to add more particles.

19. The system of embodiment 18, comprising an injection line configured to transport a slurry of the particles to the injection manifold.

20. The system of embodiments 18 or 19, comprising a static mixer configured to mix the particles with the fluid stream.

21. The system of any one of embodiments 18-20, wherein the particles are microencapsulated particles of the phase change material.

22. The system of any one of embodiments 18-21, wherein a surface of the particles is hydrophilic.

23. The system of any one of embodiments 18-21, wherein a surface of the particles is hydrophobic.

24. The system of any one of embodiments 18-23, wherein the phase change material comprises an inorganic material, an organic material, a eutectic blend, or any combinations thereof.

25. The system of any one of embodiments 18-23, wherein the phase change material comprises a salt hydrate.

26. The system of any one of embodiments 18-23, wherein the phase change material comprises a eutectic solution.

27. The system of any one of embodiments 18-23, wherein the phase change material comprises a fatty acid, a waxes, an oil, a polyglycol, an organic material, or any combinations thereof.

28. The system of any one of embodiments 18-23, wherein the phase change material comprises materials that form a clathrate hydrate at a selected temperature.

29. A method for protecting a subsea production line from fouling, comprising:

transporting a slurry of particles to an injection manifold on a subsea line, wherein the particles comprise a phase change material;

injecting the particles into a fluid stream in the subsea line;

transporting the fluid stream to a processing facility at the surface;

separating the particles from the fluid stream;

heating the particles to recharge the phase change material; and recycling the particles back to the injection manifold.

30. The method of embodiment 29, comprising modifying the particles to create a hydrophobic surface configured to enhance a concentration of the particles in a hydrocarbon phase.

31. The method of embodiments 29 or 30, comprising modifying the particles to create a hydrophilic surface configured to enhance a concentration of the particles in an aqueous phase.

32. The method of embodiments 29-31, comprising adding more particles to compensate for particles lost during transportation and separation.

33. The method of embodiments 29-32, comprising modifying the particles to move to an interface in a low shear condition.

34. A method for melting clathrate solids or wax solids, comprising injecting phase change materials (PCMs) in a carrier fluid into a production line.

35. The method of embodiment 34, wherein the solids or wax solids are below a solid equilibrium temperature.

36. The method of embodiments 34-35, comprising injecting thermodynamic hydrate inhibitors (THIs), low-dosage hydrate inhibitors (LDHIs), warm fluids, or combinations thereof.

37. The method of embodiments 34-36, comprising actively heating a production fluid.

38. The method of embodiments 34-37, comprising depressurizing the production line.

39. A system for protecting a fluid transportation system from fouling, comprising:

particles comprising a phase change material configured to release energy at a selected temperature;

a production fluid pipeline having an annulus which covers one or more portions of the production fluid pipeline;

a pump;

a PCM source;

a production manifold;

one or more production wells.

40. The system of embodiment 39, wherein the PCM source is a PCM regenerator.

41. The system of embodiment 39 or 40, further comprising a PMC return umbilical.

42. The system of any of embodiments 39-41, further comprising one or more PCM diverters.

43. A method for protecting a fluid stream from fouling, comprising:

providing a system for protecting a fluid transportation system of any of embodiments 39-42;

injecting the particles into the annulus thereby keeping the production and PCM streams from intermingling.

44. The method of embodiment 43, wherein the particles are injected into the annulus in a direction counter current to the flow of the production fluid or co-current to the flow of the production fluid.

45. The method of embodiment 43 or 44, wherein the particles are circulated through the annulus while the production fluid is shut in.

46. The method of embodiment 43 or 44, wherein the production fluid is flowing while the particles are shut in the annulus.

What is claimed is:

1. A method for melting clathrate hydrate solids or wax solids in a hydrocarbon production pipeline, comprising injecting microencapsulated liquid exothermic phase change materials (PCMs) in a carrier fluid directly into the production pipeline or in an annulus which covers one or more portions of the hydrocarbon production pipeline, wherein the PCMs are configured to undergo a phase change by solidification and release heat at a selected temperature.

2. The method of claim 1, wherein the solids or wax solids are below a solid equilibrium temperature.

3. A system for protecting a fluid transportation system from fouling, comprising:

particles comprising a microencapsulated liquid exothermic phase change material (PCM) configured to undergo a phase change by solidification and release heat at a selected temperature;

a production fluid pipeline having an annulus which covers one or more portions of the production fluid pipeline;

a PCM source connected to the annulus such that the PCM flows therethrough; and a pump configured to pump the PCM into the annulus.

4. The system of claim 3, wherein the PCM source is a PCM regenerator.

5. The system of claim 3, further comprising a PCM umbilical connected to the PCM source, the PCM umbilical configured to transmit the PCM to the PCM source or from the PCM source.

6. A method for protecting a fluid stream from fouling, comprising:
　providing a system for protecting a fluid transportation system of claim 3; and
　injecting the particles into the annulus thereby keeping a production fluid and the PCM from intermingling.

7. The method of claim 6, wherein the particles are injected into the annulus in a direction counter current to a flow of the production fluid or co-current to the flow of the production fluid.

8. The method of claim 6, wherein the particles are circulated through the annulus while the production fluid is shut in.

9. The method of claim 6, wherein the production fluid is flowing while the particles are shut in the annulus.

10. The method of claim 6, comprising heating the particles to reverse the phase change.

11. The method of claim 1, wherein the selected temperature is greater than a wax or hydrate melting temperature.

12. The method of claim 1, comprising separating the PCMs from the carrier fluid.

13. The method of claim 12, comprising:
　heating the PCMs to reverse the phase change, thereby recharging the phase change material; and
　re-injecting the PCMs into the carrier fluid.

14. The method of claim 1, comprising heating the particles to reverse the phase change.

\* \* \* \* \*